US012011401B1

(12) United States Patent
Gold et al.

(10) Patent No.: US 12,011,401 B1
(45) Date of Patent: Jun. 18, 2024

(54) WHEELCHAIR LIFT APPARATUS

(71) Applicant: BBD Lift LLC, Springfield, OR (US)

(72) Inventors: Bryan Kelly Gold, Marcola, OR (US); Bud Edwin Johnson, Springfield, OR (US)

(73) Assignee: BBD Lift LLC, Springfield, OR (US)

( * ) Notice: Subject to any disclaimer, the term of this patent is extended or adjusted under 35 U.S.C. 154(b) by 0 days.

(21) Appl. No.: 18/506,130

(22) Filed: Nov. 9, 2023

(51) Int. Cl.
*A61G 5/06* (2006.01)

(52) U.S. Cl.
CPC .................................... *A61G 5/068* (2013.01)

(58) Field of Classification Search
CPC ...................................................... A61G 5/068
See application file for complete search history.

(56) References Cited

U.S. PATENT DOCUMENTS 4,415,202 A * 11/1983 Pew ..................... A61G 7/1067 5/86.1
4,664,584 A * 5/1987 Braun .................... A61G 3/062 187/217
4,679,810 A * 7/1987 Kimball ............... B62D 61/065 182/127
4,775,282 A * 10/1988 Van Vliet .................. B60R 9/06 414/921
4,823,895 A * 4/1989 Kimball ................. B62D 11/10 280/166
6,467,785 B2 * 10/2002 Toppses ............... A61G 5/1059 280/250.1
6,935,648 B2 * 8/2005 Beck .................... A61G 5/1054 280/250.1
8,998,558 B2 * 4/2015 Kitchin .................... A61G 3/06 414/544
9,808,388 B2 11/2017 Powell
2002/0079727 A1 * 6/2002 Hoegh ................. A61G 5/1059 297/313

* cited by examiner

*Primary Examiner* — Jacob D Knutson
(74) *Attorney, Agent, or Firm* — David S. Alavi

(57) ABSTRACT

A wheelchair lift apparatus includes a vertical lift rail attached to a front frame of the wheelchair, a support plate slidably engaged with the lift rail and extending horizontally forward, and an actuator for moving the support plate along the lift rail. The wheelchair lift apparatus enables a person to move from sitting on the ground to sitting on the wheelchair, and vice versa, without using his/her legs and without assistance from another person. With the support plate lowered onto or near the ground, a person can maneuver, without using his/her legs, between sitting on the ground or on the support plate. With the support plate raised to flush with the wheelchair seat, the person can maneuver, without using his/her legs, between sitting on the wheelchair seat or on the support plate. The support plate can be positioned along the lift rail to act as a footrest.

28 Claims, 11 Drawing Sheets

WHEELCHAIR LIFT APPARATUS

FIELD OF THE INVENTION

The field of the present invention relates to wheelchairs. A lift apparatus for a wheelchair is disclosed.

SUMMARY

An inventive wheelchair lift apparatus comprises a lift rail, a support plate, and an actuator. The lift rail is structurally arranged to be connected to a wheelchair in a generally vertical orientation at a first front vertical frame member of the wheelchair. The support plate is generally flat, and is engaged with the lift rail to be movable along at least a portion of the lift rail. The support plate is structurally arranged so that, with the lift rail connected to the wheelchair and the support plate engaged with the lift rail, the support plate extends forward from the wheelchair in a generally horizontal orientation. The actuator is structurally arranged and operatively coupled to move the support plate along the lift rail between a ground position and a seat position. In the ground position, the support plate is positioned on or near the ground; in the seat position the support plate is positioned generally flush with a seat of the wheelchair. The wheelchair lift apparatus enables a person to move from sitting on the ground to sitting on the wheelchair, and vice versa, without using his/her legs and without assistance from another person.

With the support plate in the ground position, a person can maneuver him/herself, without using his/her legs, from a seated position on the ground into a seated position on the support plate with his/her back to the wheelchair. Activating the actuator moves the support plate, with the person seated thereon, from the ground position to the seat position. The person can then maneuver him/herself, without using his/her legs, from a seated position on the support plate into a seated position on the seat of the wheelchair. Activating the actuator then moves the support plate from the seat position toward the ground position, stopping with the support plate at a position at or above the ground position to act as a footrest for the person in the seated position on the seat of the wheelchair.

With the person in a seated position on the seat of the wheelchair, activating the actuator moves the support plate away from the ground position to the seat position. The person can then maneuver him/herself, without using his/her legs, from the seated position on the seat of the wheelchair into a seated position on the support plate with his/her back to the wheelchair. Activating the actuator moves the support plate, with the person seated thereon, from the seat position to the ground position. The person can then maneuver him/herself, without using his/her legs, from a seated position on the support plate into a seated position on the ground.

Objects and advantages pertaining to wheelchair lift apparatus may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1A:
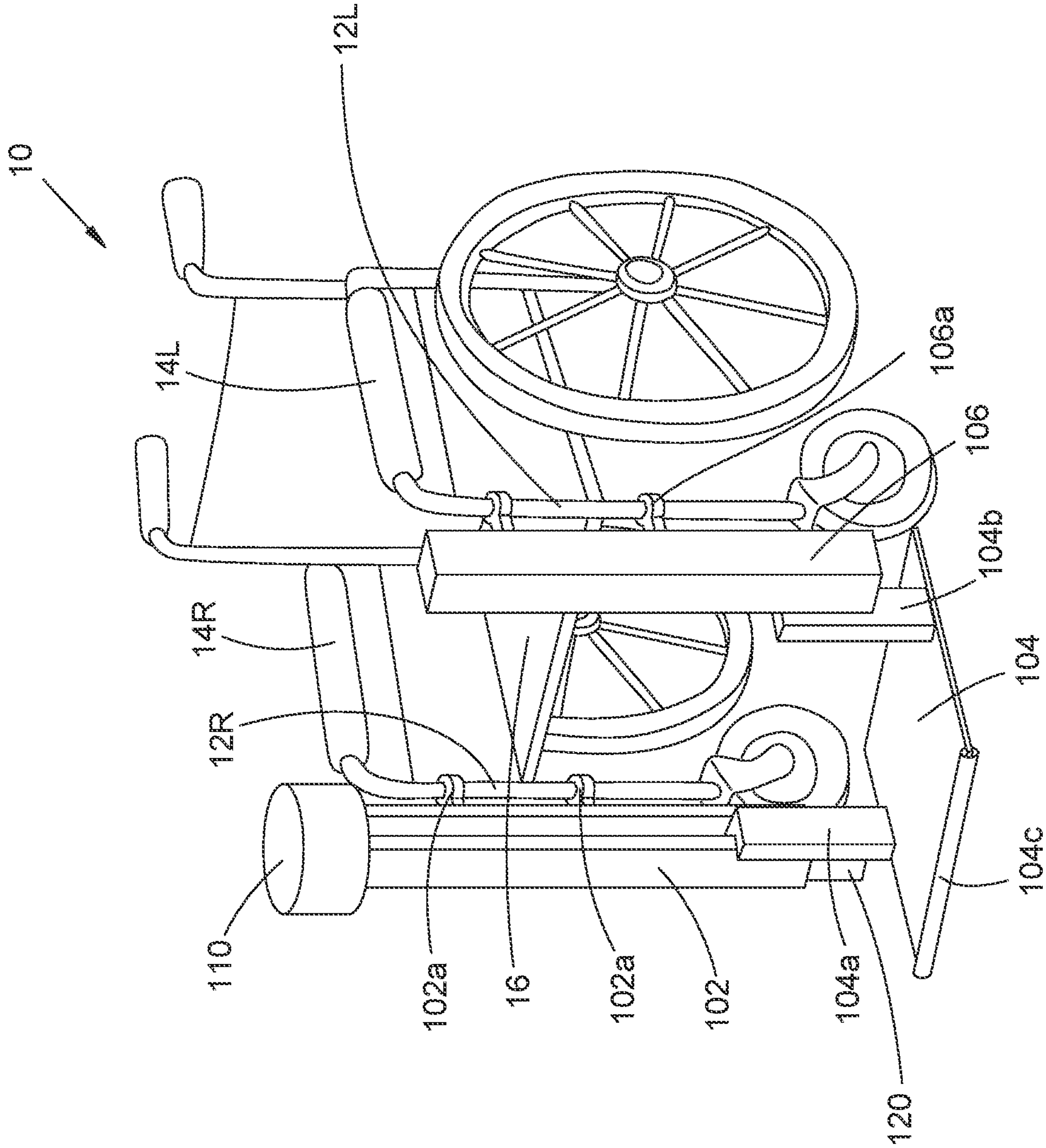
FIGS. 1A and 1B are schematic perspective and side views of a wheelchair with an example lift apparatus in a ground position.
Figure 1B:
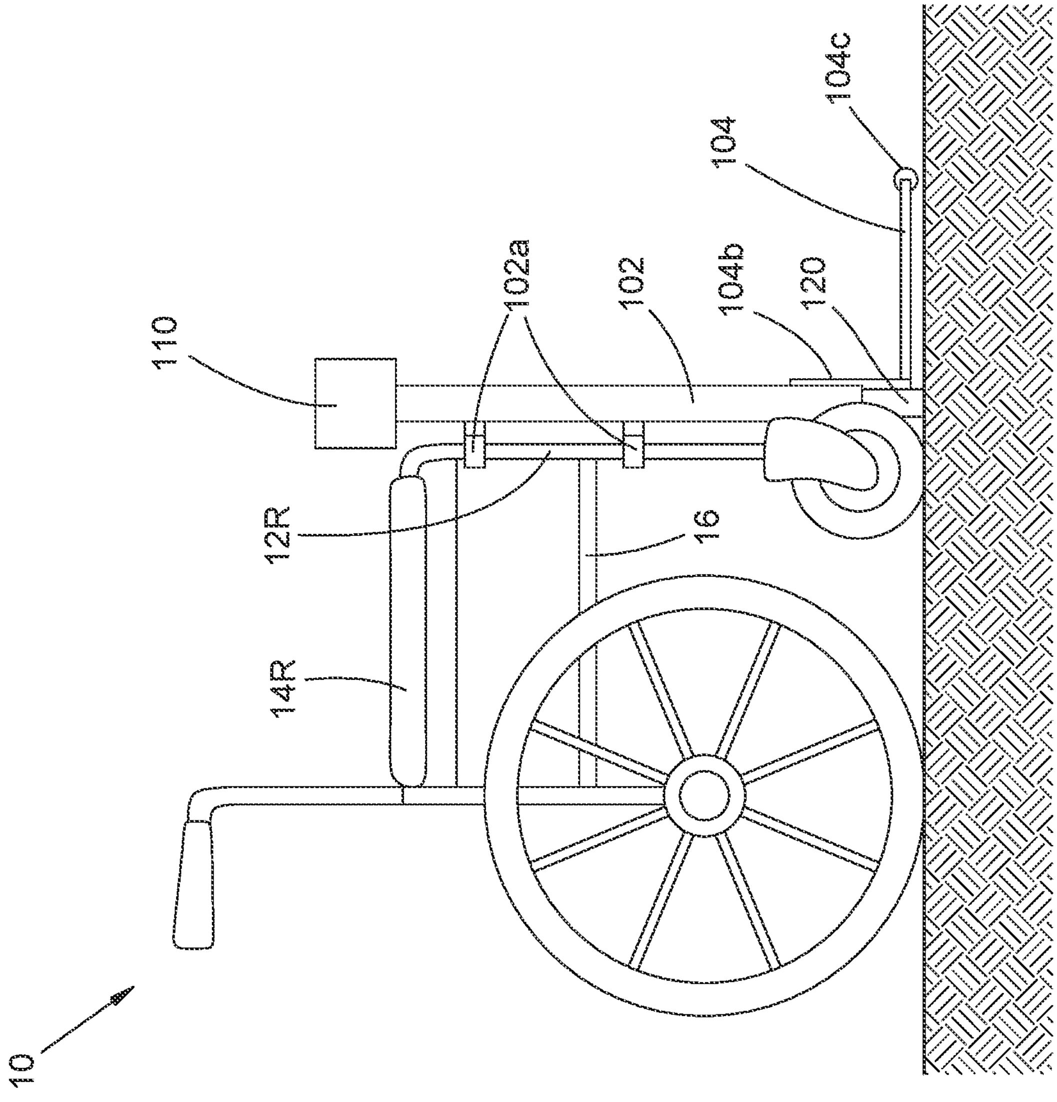
Figure 2A:
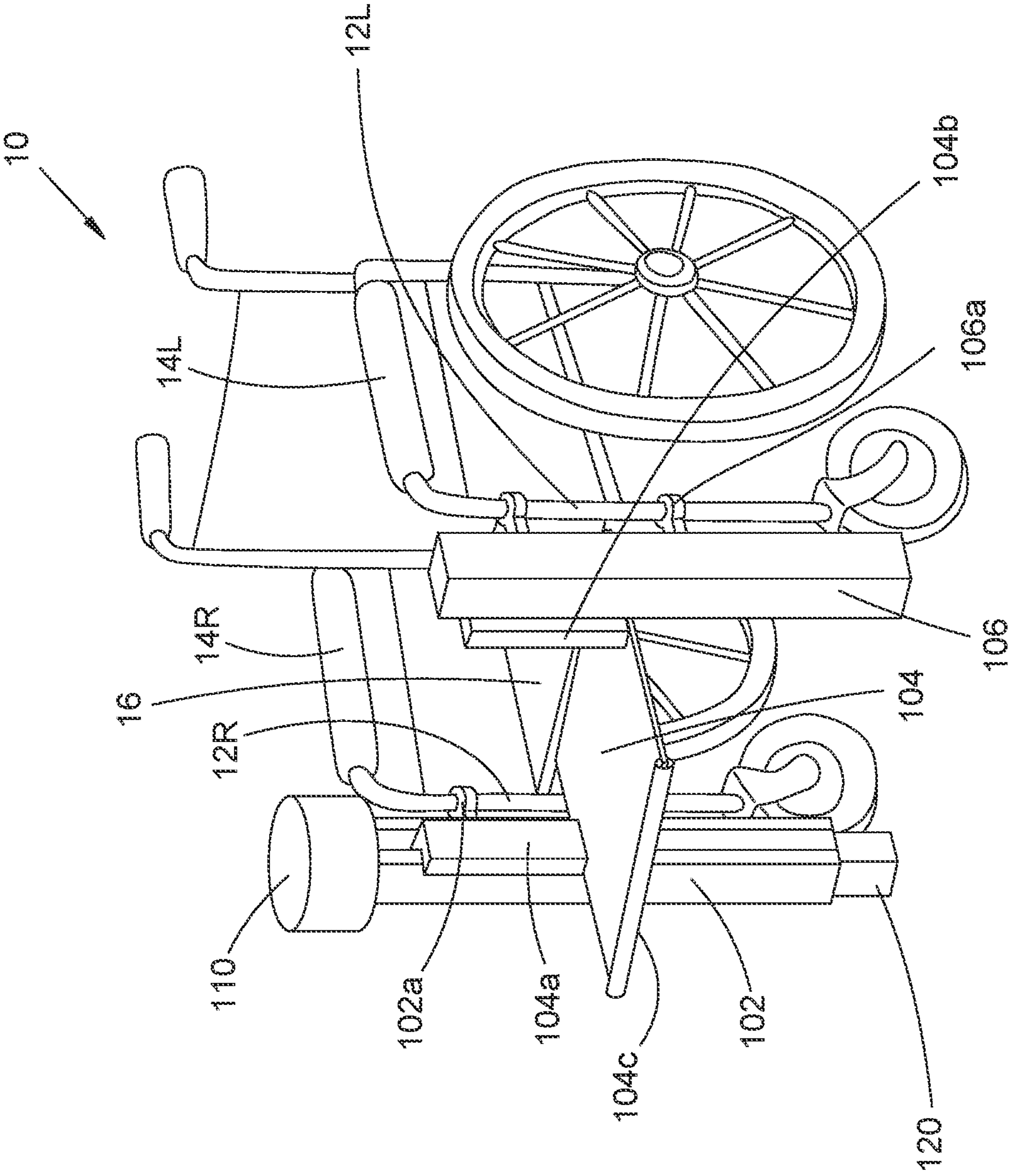
FIGS. 2A and 2B are schematic perspective and side views of a wheelchair with an example lift apparatus in a seat position.
Figure 2B:
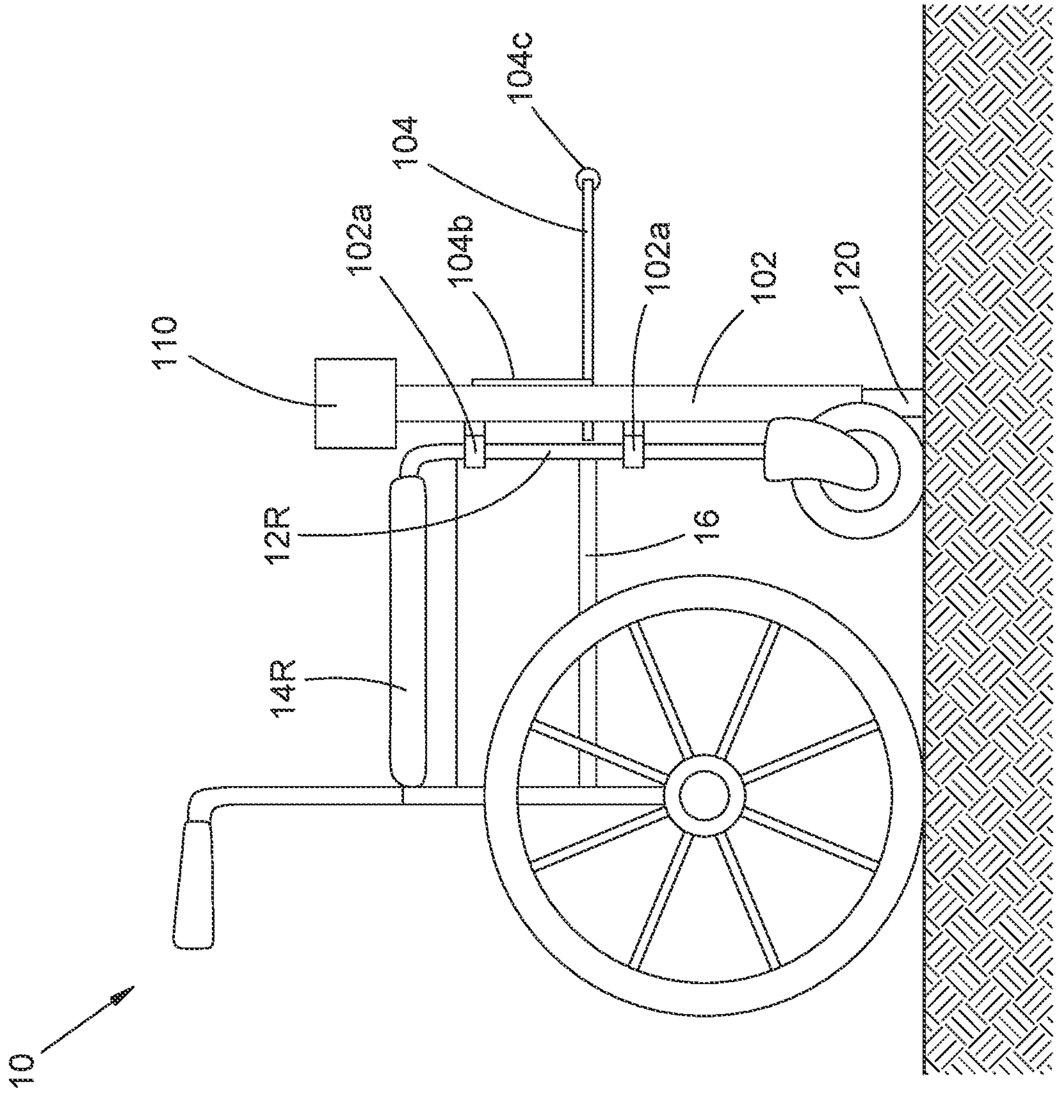

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the inventive subject matter. The detailed description illustrates by way of example, not by way of limitation, the principles of the inventive subject matter.

Many instances arise in which a wheelchair-bound person might want to move from a seated position on the wheelchair to a seated position on the floor, or vice versa. An example of a lift apparatus for assisting with that transition is disclosed in U.S. Pat. No. 9,808,388 to Powell. The Powell apparatus is separate from the wheelchair, and must be brought to where it is needed for use, presumably by another person assisting the wheelchair-bound person. It would be desirable to provide a wheelchair lift apparatus that is attached to, the therefore moves about with, the wheelchair.

An example of an inventive wheelchair lift apparatus, and use thereof, is illustrated schematically in FIGS. 1A through 7. The wheelchair lift apparatus comprises a lift rail 102, a support plate 104, and an actuator 110. The lift rail 102 is structurally arranged to be connected to a wheelchair 10 in a generally vertical orientation at a first front vertical frame member 12 of the wheelchair (either the right vertical frame member 12R (as shown in the drawings), or the left front vertical frame member 12L). The support plate 104 is generally flat, and is (i) engaged with the lift rail 102 to be movable along at least a portion of the lift rail 102 and (ii) structurally arranged so that, with the lift rail 102 connected to the wheelchair 10 and the support plate engaged 104 with the lift rail 102, the support plate 104 extends forward from the wheelchair in a generally horizontal orientation. The actuator 110 is structurally arranged and operatively coupled to move the support plate 104 along the lift rail 102 between a ground position (as in FIGS. 1A and 1B) and a seat position (as in FIGS. 2A and 2B). In the ground position, the support plate 104 is on or near the ground; in the seat position, the support plate 104 is generally flush with a seat 14 of the wheelchair 10.

Figure 3A:
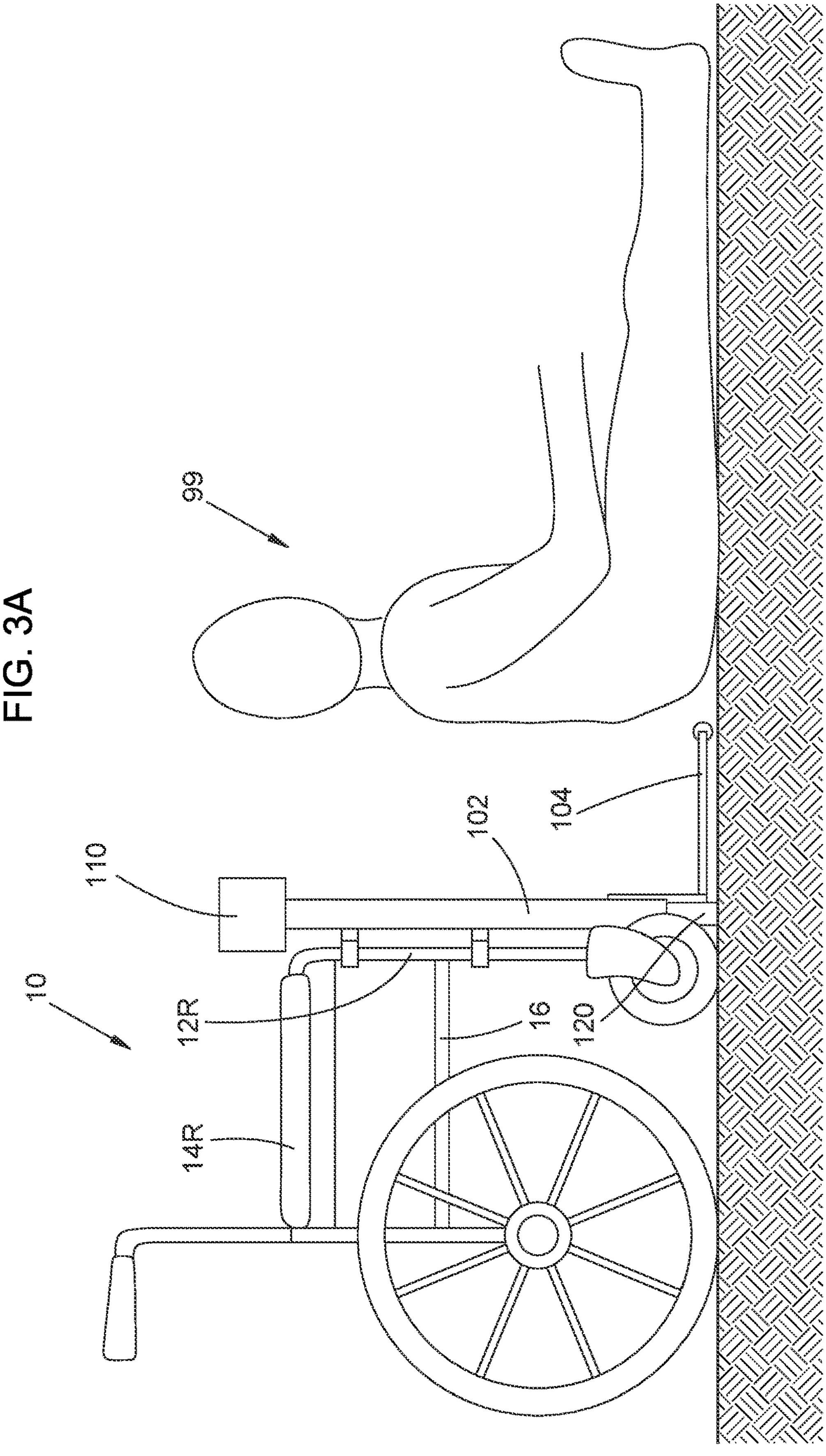
FIGS. 3A and 3B are schematic side views of a person sitting on the ground (3A) and on the support plate (3B) of an example wheelchair lift apparatus in the ground position.
Figure 3B:
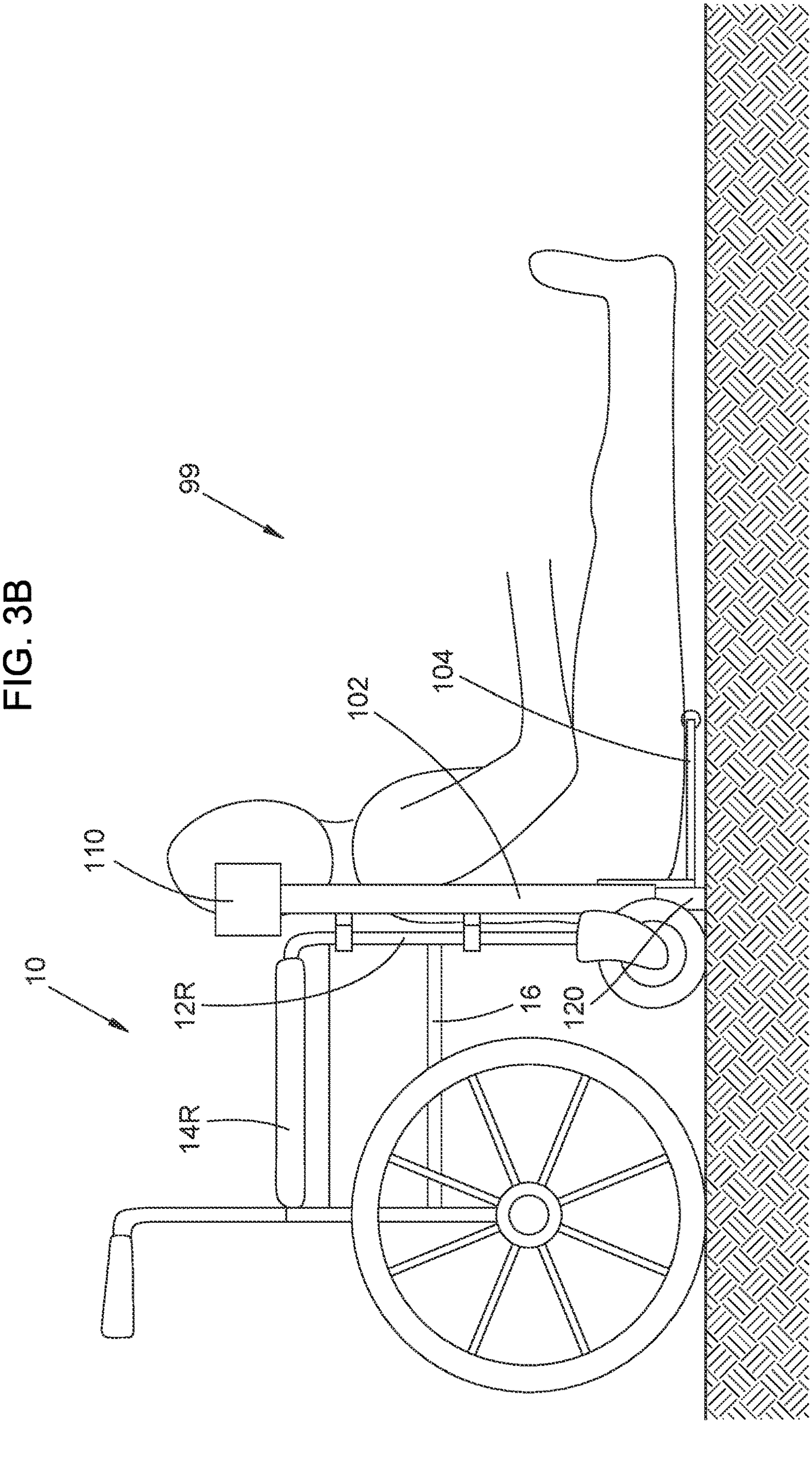

With the support plate 104 in the ground position, a person 99 can maneuver him/herself, without using his/her legs, (i) from a seated position on the ground (e.g., as in FIG. 3A) into a seated position on the support plate 104 with his/her back to the wheelchair (e.g., as in FIG. 3B), or (ii) from a seated position on the support plate with his/her back to the wheelchair (e.g., as in FIG. 3B) into a seated position on the ground (e.g., as in FIG. 3A). With the support plate 104 in the seat position, the person 99 can maneuver him/herself, without using his/her legs, (i) from a seated position on the support plate 104 with his/her back to the wheelchair 10 (e.g., as in FIG. 4A) into a seated position on the seat 14 of the wheelchair 16 (e.g., as in FIGS. 4B and 4C), or (ii) from a seated position on the seat 18 of the wheelchair 10 (e.g., as in FIGS. 4B and 4C) into a seated position on the support plate 104 with his/her back to the wheelchair 10 (e.g., as in FIG. 4A).

In some examples the lift rail 102 can be detachably assembled with the front vertical frame member 12 of the wheelchair 10. Any suitable attachment mechanism or arrangement can be employed, e.g., clamps 102*a* that clamp onto the vertical frame member 12 or fasteners that attach the lift rail 104 to the vertical frame member 12. Such detachable assembly can enable the lift apparatus to be added on to an existing wheelchair as an upgrade, or can enable the lift apparatus to be removed during times that it is unlikely to be needed, then reattached at other times when it is likely to be needed. The clamp 102*a* can be of any suitable type or arrangement, e.g., a split collar (e.g., attached to the lift rail 102 permanently, as in FIG. 6A, or using a quick-disconnect arrangement with pins 102*b*, as in FIGS. 6B and 6C), a worm gear clamp, a spring clamp, or a quick-release clamp (e.g., such as those employed in bicycles). A fastener can be of any suitable type or arrangement, e.g., bolts or pins passing through the vertical frame member 12. In some examples the lift rail can be permanently attached to the vertical frame member 12, e.g., by welding, soldering, or brazing, or by using rivets or other permanent fasteners. Such permanent attachment can be employed for upgrading an existing wheelchair to include the lift apparatus, or for manufacturing a new wheelchair that includes the lift apparatus. In some examples the lift rail can be integrally formed with the vertical frame member 12 of the wheelchair 10, e.g., for manufacturing a new wheelchair. In some integrally formed examples the lift rail 102 can be incorporated within the vertical frame member 12, or a hollow or tubular vertical frame member 12 can act as the lift rail 102.

The lift rail 102 and the lift plate 104 can include one or more suitable materials that are sufficiently rigid and strong to support the weight of the user 99 sitting on the support plate 104. In some examples metals, metal alloys, polymers, or composites (e.g., carbon fiber composite) can be employed. Any suitable mechanism or arrangement can be employed for engaging the support plate 104 to slide along the lift rail 102, e.g., dovetail, T-slot, other groove or slot or channel, and so forth. In some examples the lift rail 102 can be arranged as a U-shaped or slotted channel, and the support plate 104 can be attached to a lift block 104*a* that slides within the channel of the lift rail 102 so as to engage the support plate 104 with the lift rail 102. In some examples the channel of the lift rail 102 and the lift block 104*a* can be suitably arranged to constrain movement of the support plate 104 to only linear movement along the lift rail 102, while limiting or preventing other motion, e.g., rotation or twisting of the support plate 104 relative to the lift rail 102. In some examples (e.g., as in FIG. 5) the lift block 104*a* can include a portion shaped generally as a rectangular block having a transverse cross-section that roughly corresponds to a transverse cross-section of the channel of the lift rail 102, enabling the lift block 104*a* to slide along the lift rail 102 without, or with only limited, twisting or rotation relative to the lift rail 102. In some examples the lift rail 102 or the lift block 104*a*, or both, can include one or more friction materials for facilitating movement of the support plate 104 along the lift rail 102.

The actuator 110 can be of any suitable type or arrangement. In some examples, including those in which the lift rail 102 is arranged as a lift rail channel with a lift block 104*a* sliding within the channel (e.g., as in FIG. 5), the actuator 110 can include a lead screw 110*a* that (i) is positioned within the channel of the lift rail 104, (ii) passes through the lift block 104*a*, and (iii) is threadedly engaged with the lift block 104*a*. In such examples the actuator 110 can further include a motor or drive mechanism of any suitable type operatively coupled to turn the lead screw 110*a* to move the lift block 104*a* along the lift rail 104 within the lift rail channel. Other suitable actuators can be employed, e.g., rack and pinion, sprockets and chain, pulleys and cable, rope, or belt, pneumatic, hydraulic, and so forth, with suitable corresponding motors or drive mechanisms to drive them. Any suitable power source for the actuator 110 can be employed. Given that the wheelchair lift device is intended to move with the wheelchair, in some examples a portable power source such as a battery can be advantageously employed. In some examples a rechargeable battery can be employed, e.g., a purpose-built rechargeable battery, or a commercial-standard rechargeable battery interchangeably usable with power tools. In some examples a battery can be integrated into the wheelchair lift device (e.g., as part of the actuator 110); in some examples a battery can be a removeable component.

In some examples (including those shown in the drawings) the wheelchair lift apparatus can further include a guide rail 106 that is structurally arranged to be connected to the wheelchair in a generally vertical orientation at a second front vertical frame member 12 of the wheelchair 10, with the second front vertical frame member 12 being opposite the first front vertical frame member 12. In the example shown in the drawings, the first vertical frame member 12 to which the lift rail 102 is attached is the right front vertical frame member 12R, while the second vertical frame member 12 to which the guide rail 106 is attached is the left front vertical frame member 12L. The support plate 104 can be engaged with the guide rail 106 (*i*) to be moveable along at least a portion of the guide rail 106 and (ii) to prevent or limit, with the support plate 104 engaged with the lift rail 102 and with the guide rail 106, rotation or tilt of the support plate 104 relative to the lift rail 102. The guide rail 106 can be detachably assembled with the vertical frame member 12, permanently attached to the vertical frame member 12, or integrally formed with the vertical frame member 12, in any of the ways described above for the lift rail 102. In the examples shown the guide rail 106 is attached to the vertical frame member 12L with clamps 106*a*.

The guide rail 106 can include any one or more suitably rigid and strong materials, including one or more of the materials included in the lift rail 102 or the support plate 104. Any suitable mechanism or arrangement can be employed for engaging the support plate 104 to slide along the guide rail 106, including any of those described above for sliding engagement of the support plate 104 with the lift rail 102. In some examples the guide rail 106 can be arranged as a U-shaped or slotted channel, and the support plate 104 can be attached to a guide block 104*b* that slides within the channel of the guide rail 106 so as to engage the support plate 104 with the guide rail 106. In some examples engagement of the guide block 104*b* with the channel or the guide rail 106 can be arranged in any of the ways described above for the lift block 102 engaged with the lift rail 102.

With the person 99 seated on the support plate 104, the forward position of the person 99 will tend to tip the wheelchair 10 forward. In some examples a support leg 120 can be employed to prevent or limit forward tilting of the wheelchair 10 while the lift apparatus is in use. The support leg 120 can be structurally arranged to be connected to the wheelchair 10 at a lower front portion of the wheelchair 10, and to be moveable between (i) a support position in contact with the ground so as to prevent or limit forward tilting of the wheelchair 10 (e.g., as in FIGS. 3A, 3B, 4A, and 4B) and (ii) a retracted position not in contact with the ground so as to enable unimpeded rolling movement of the wheelchair 10 (e.g., as in FIG. 4C). In some examples (including those shown in the drawings) the support leg 120 can be positioned at a lower end of the forward vertical frame member 12. In some examples the support leg 120 can be slidably engaged with a lower portion of the lift rail 102, with a suitable locking mechanism (e.g., a spring-loaded lever) to hold the support leg 120 in the support position (so as to bear a portion of the weight of the person 99) or in the retracted position (so as not to interfere with rolling movement of the wheelchair 10); in some examples the support leg 106 can instead be similarly slidably engaged with the guide rail 106 (if present). In some examples movement of the support leg 102 can be effected manually by the person 99 (or another person, if present). In other examples the lift apparatus can further include a support leg actuator structurally arranged and operatively coupled to move the support leg 120 between the support position and the retracted position. In some examples a lower end of the support leg 102 can include a foot portion that extends medially toward the other forward vertical frame member 12 (e.g., under the support plate 104 in its ground position). Such a foot portion can prevent or limit lateral tilting of the wheelchair with the person 99 seated on the support plate 104.

In some examples the wheelchair lift apparatus can include one or both of (i) an upper limit switch positioned and arranged so as to deactivate the actuator 110 to limit movement of the support plate 104 away from the ground position beyond the seat position, or (ii) a lower limit switch positioned and arranged so as to deactivate the actuator 110 to limit movement of the support plate 104 away from the seat position beyond the ground position. Limit switch(es), if present, can be of any suitable type or arrangement, e.g., electromechanical switch(es) or interrupt(s), or optical sensor(s). In some examples the wheelchair apparatus can include one or more control switches connected to the actuator 110 and operatively coupled to control the actuator 110. In some of those examples the one or more switches can be attached to or integrated into the actuator 110 or a housing thereof (e.g., a motor housing at the top of the lift rail 102); in some of those examples the one or more switches can be structurally arranged to be attached to, or can be integrated into, an armrest 14 of the wheelchair 10 (either the right armrest 14R or the left armrest 14L); in some of those examples the one or more switches can be attached to or integrated into the support plate 104. In some examples the wheelchair lift apparatus can further include a remote-control module operatively coupled to control the actuator 110 (wired or wireless).

In some examples the support plate 104 can include a vertically enlarged forward edge 104*c*. In some examples the enlarged forward edge 104*c* can be formed by a tubular member with the front edge of the support plate 104 inserted into a longitudinal slot in the tubular member. If the support plate 104 and the tubular member are metallic, they can be welded, brazed, or soldered; any suitable material(s), attachment, or arrangement of the enlarged forward edge 104*c* can be employed. The enlarged forward edge 104*c* of the support plate 104 is arranged so as to reduce the likelihood of the person 99, in a sitting position on the support plate 104 with his/her back to the wheelchair 10, would slide forward off the support plate 104. The vertically enlarged forward edge 104*c* therefore acts to enhance safety of the person 99 while using the wheelchair lift device. A rounded forward edge 104*c*, such as that shown in the drawings, can also reduce the likelihood of snagging or entangling clothing of the person 99, while lifting or lowering the support plate 104, or while maneuvering onto or off of the support plate 104. In some examples the support plate can further include one or more of, e.g., texturing or gridding to reduce slippage, or holes or slots to reduce slippage or facilitate drainage.

In some examples, instead of or in addition to the vertically enlarged front edge 104*c*, the wheelchair lift apparatus can include a safety belt or safety strap arranged for securing the person 99 while seated on the support plate 104. Such a safety belt or safety strap can be arranged in any suitable way, with any suitable fastener or closure (e.g., side buckle, tongue buckle, hook-and-loop fasteners (e.g., Velcro®), tying or knotting, snaps or buttons, and so forth) and can be attached at any suitable position on the wheelchair lift apparatus; in some examples attachment of the safety strap or safety belt to the support plate 104 can be advantageously employed.

Figure 4A:
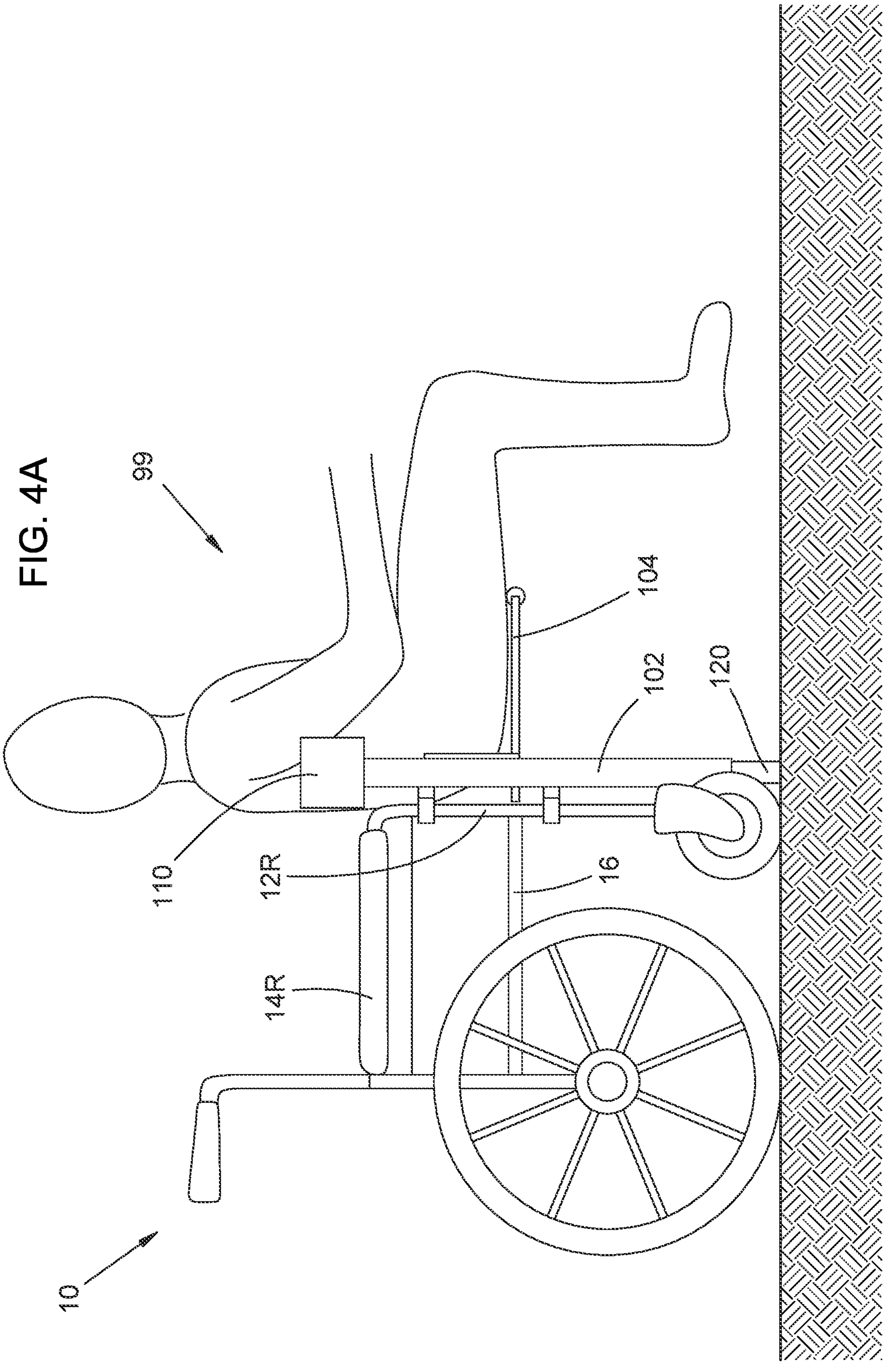
FIGS. 4A and 4B are schematic side views of a person sitting on the support plate (4A) of an example wheelchair lift apparatus in the seat position and on the wheelchair seat (4B).
Figure 4B:
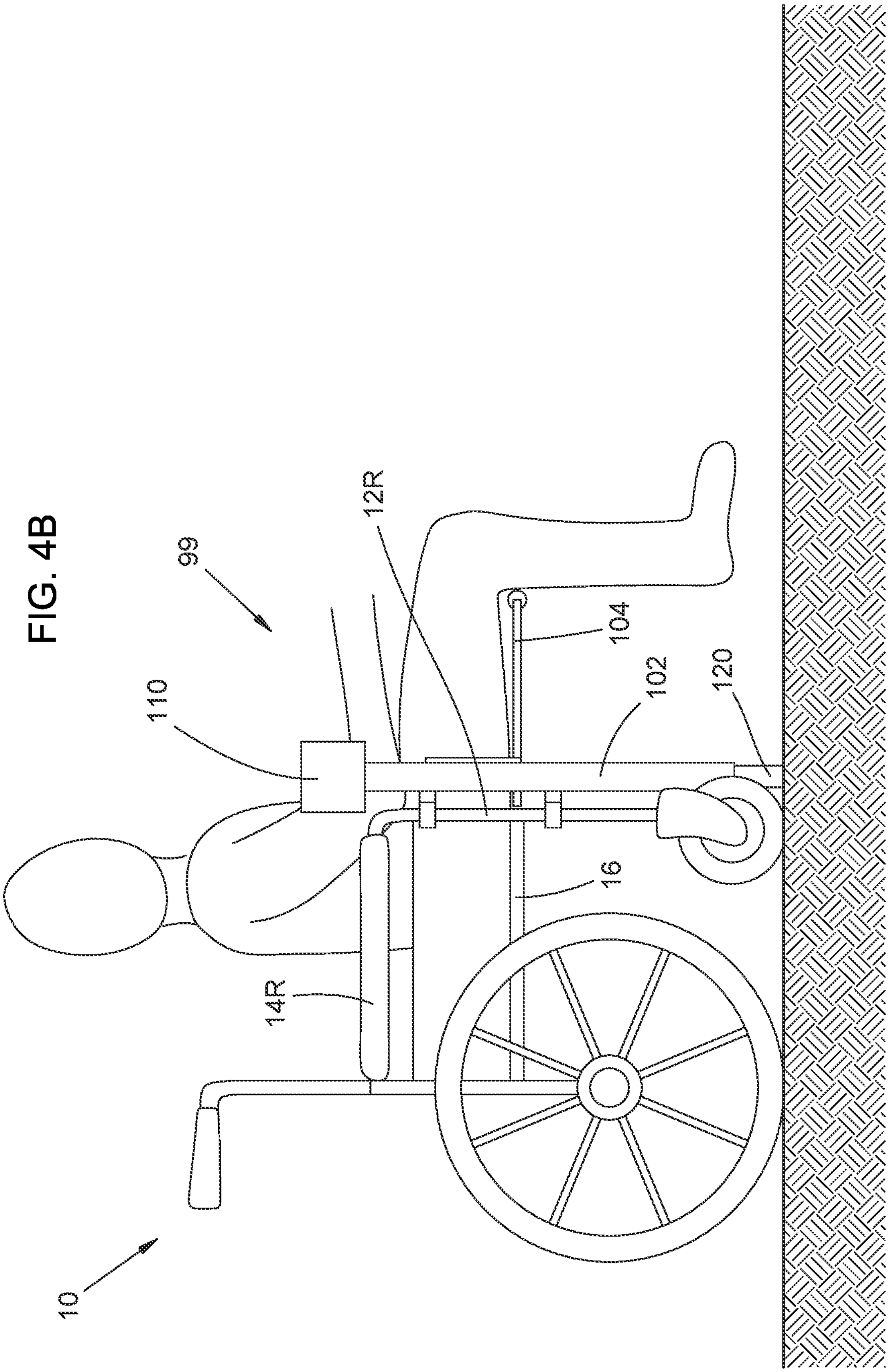
Figure 4C:
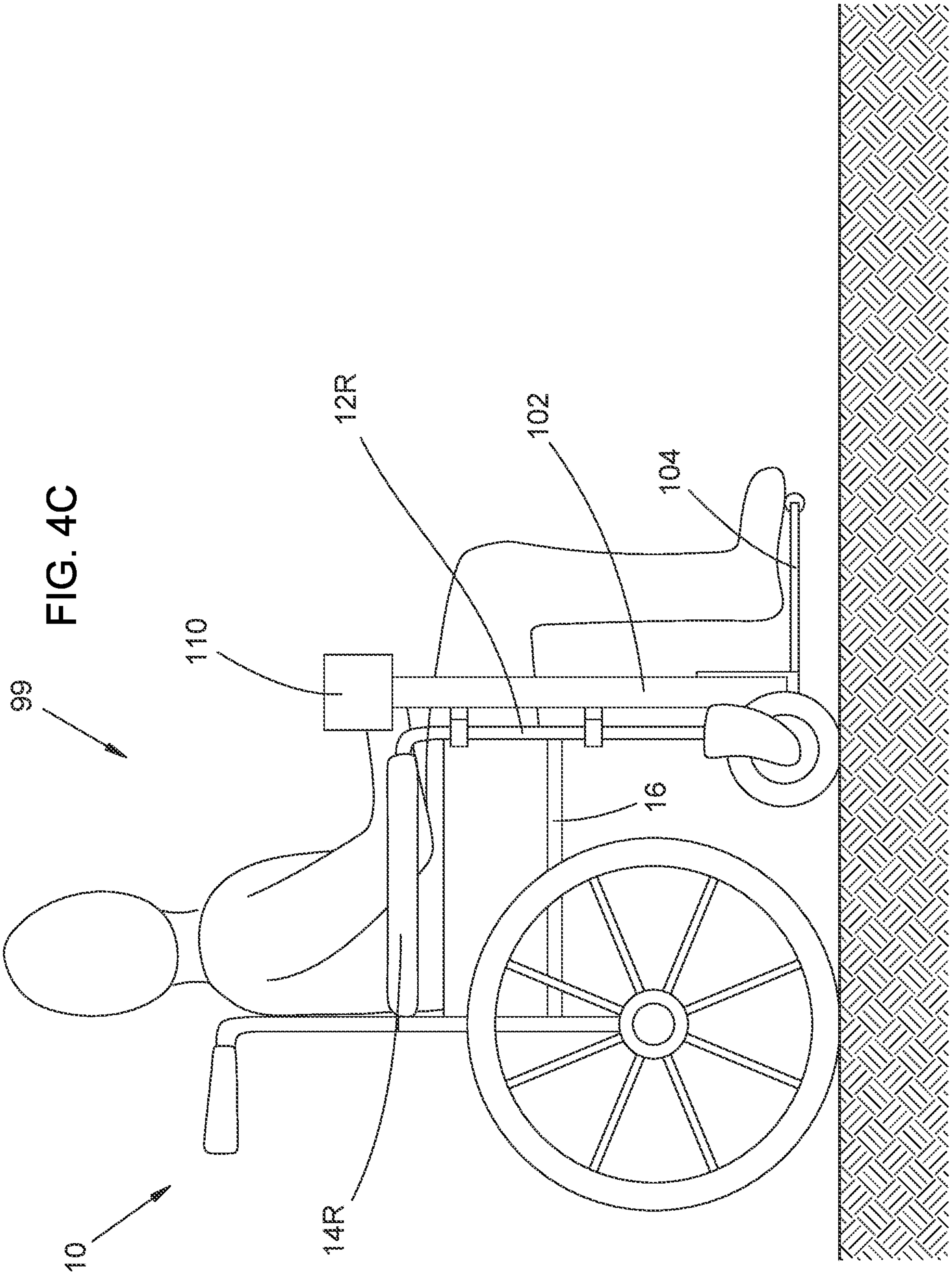
FIG. 4C is a schematic side view of a person sitting on the wheelchair seat with the support plate of the example wheelchair lift apparatus positioned as a footrest.
Figure 7:
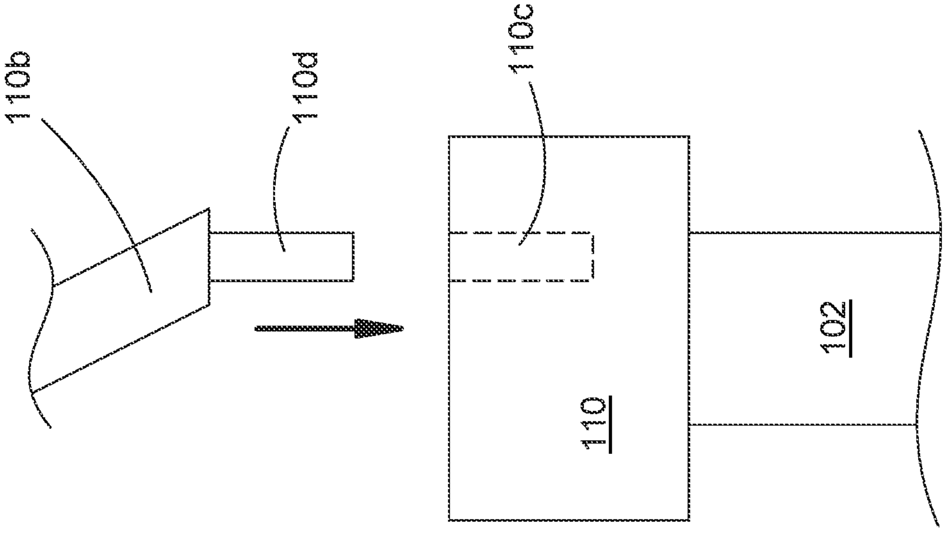
FIG. 7 is a schematic diagram of a mount for a device holder of an example wheelchair lift apparatus.
Figure 5:
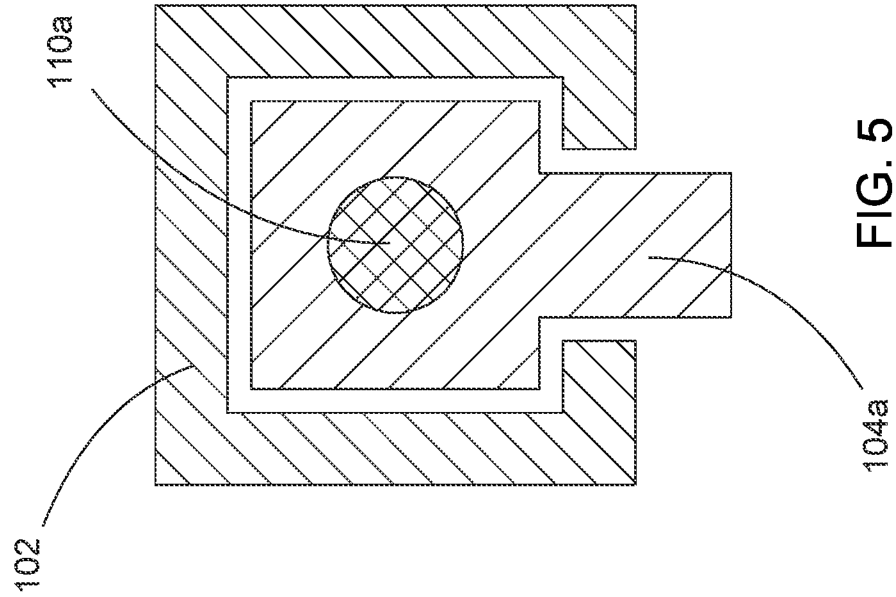
FIG. 5 is a transverse cross-sectional view of a lift support block within a lift rail of an example wheelchair lift apparatus.
Figure 6B:
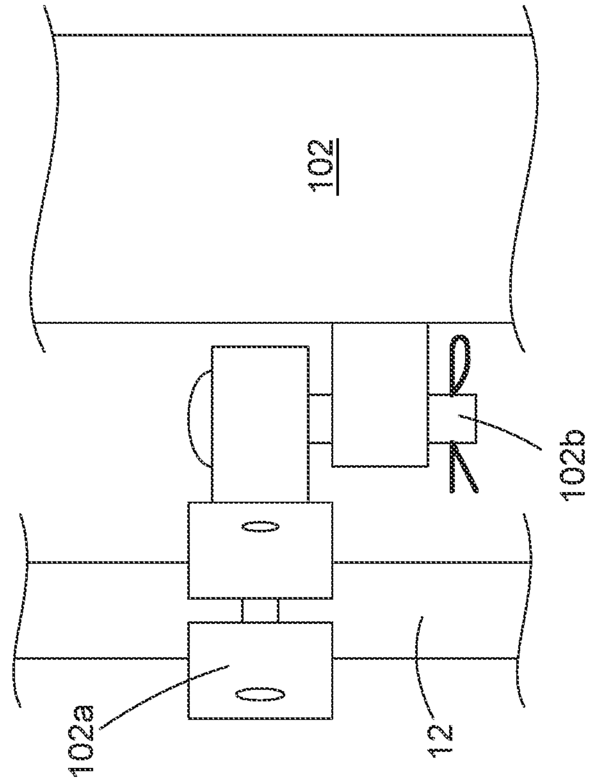
FIGS. 6B and 6C are schematic side and bottom views, respectively, of another example clamp of a wheelchair lift apparatus.
Figure 6C:
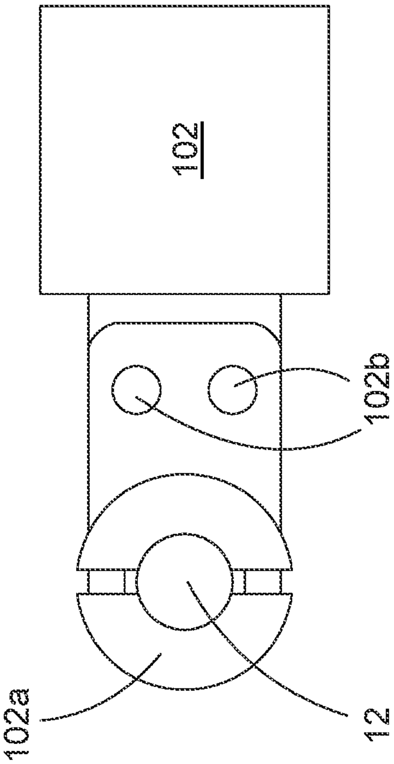
Figure 6A:
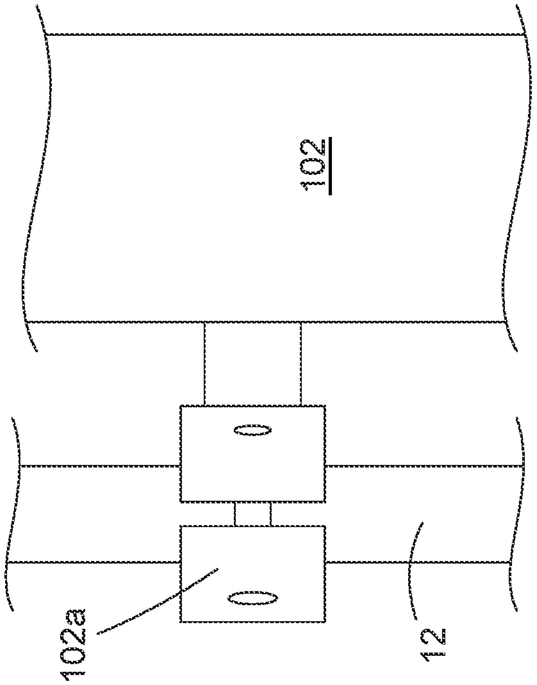
FIG. 6A is a schematic side view of an example clamp of a wheelchair lift apparatus.

With the person 99 in a seated position on the seat 16 of the wheelchair 10, the support plate 104 can be lowered toward the ground position to act as a footrest for the person 99 seated on the wheelchair 10 (e.g., as in FIG. 4C). If in the ground position the support plate 104 is in contact with the ground, then the support plate 104 would typically be positioned above the ground position to act as a footrest while not interfering with movement of the wheelchair 10. If in the ground position the support plate 104 is not in contact with the ground, then the support plate 104 could remain in the ground position to act as a footrest. In either or both of those instances, the support plate 104 could be moved to any suitable position above the ground position to act as a footrest, based on the stature and comfort of the person 99 seated on the wheelchair 10. In some examples the support plate 104 can include lateral extensions to increase the width of the support plate 104 when acting as a footrest. Such lateral extensions can be moveable between deployed and retracted positions. The deployed position can be a single position providing a single extended width for the footrest, or can be adjustable (e.g., telescoping) to provide an adjustable extended width for the footrest. Any suitable arrangement of such lateral extensions of the support plate 104 can be employed.

In some examples at least a portion of the actuator 110 (e.g., a motor or other drive mechanism) can be positioned within a housing attached, e.g., to the top of the lift rail 104, to an armrest 14 of the wheelchair 10 (the right armrest 14R in the example shown), or to another part of the wheelchair 10. Such a housing can be structurally arranged to enable retention, mounting, or attachment of one or more of, e.g., a smartphone, tablet, or other portable computing device, one or more tools or writing implements, one or more flashlights (LED or incandescent), or a cupholder. In some examples the housing can include a hole or receptacle 110*c* for receiving a rod or pin 110*d* of a mounting device 110*b* (e.g., as in FIG. 7). Multiple interchangeable mounting devices 110*b* (e.g., a phone holder, a cup holder, a tool holder, a pencil/pen holder, and so on) can all be provided with similar rods or pins 110*d* for mounting on the motor housing of the actuator 110. Other suitable arrangements can be employed.

The wheelchair lift apparatus can be employed by the person 99, without using his/her legs, to move between a sitting position on the ground and a sitting position on the wheelchair 10.

Beginning with the person 99 on the ground near the wheelchair 10, the person 99 would move near the wheelchair 10. If the brake of the wheelchair 10 is not already set, the person 99 (or another person) would typically set the brake. If the support leg 120 is not already in its support position, the person 99 (or another person) would typically move the support leg 120 into its support position. With the support plate 104 in the ground position, the person 99 can maneuver him/herself, without using his/her legs, from a seated position on the ground (e.g., as in FIG. 3A) into a seated position on the support plate 104 with his/her back to the wheelchair 10 (e.g., as in FIG. 3B). The person 99 can then activate the actuator 110 to move the support plate 104 from the ground position to the seat position 104. The vertically enlarged front edge 104*c* of the support plate 104 (if present) can reduce the likelihood of the person 99 sliding off the front edge of the support plate 104 during its upward movement. The person 99 can then maneuver him/herself, without using his/her legs, from a seated position on the support plate 104 with his/her back to the wheelchair 10 (e.g., as in FIG. 4A) into a seated position on the seat 16 of the wheelchair 10 (e.g., as in FIG. 4B). The person 99 can then activate the actuator 110 to move the support plate 104 from the seat position toward the ground position, stopping with the support plate at a position at or above the ground position to act as a footrest for the person in the seated position on the seat of the wheelchair 10 (e.g., as in FIG. 4C). Before moving about in the wheelchair, the person 99 would typically move the support leg 120 to its retracted position (e.g., as in FIG. 4C) and release the brake of the wheelchair 10.

Beginning with the person 99 sitting in the wheelchair 10 (e.g., as in FIG. 4C), typically the person 99 would set the brake of the wheelchair 10 and move the support leg 120 to its support position. The person 99 can then activate the actuator 110 to move the support plate 104 away from the ground position to the seat position (e.g., as in FIG. 4B). (Note that the movement of the support plate 104 may or may not begin at the ground position, but would begin from whatever position where the support plate 104 was used as a footrest.) The person 99 can then maneuver him/herself, without using his/her legs, from a seated position on the seat 16 of the wheelchair 10 into a seated position on the support plate 104 with his/her back to the wheelchair 10 (e.g., as in FIG. 4A). The person 99 can then activate the actuator 110 to move the support plate 104 from the seat position to the ground position. The vertically enlarged front edge 104*c* of the support plate 104 (if present) can reduce the likelihood of the person 99 sliding off the front edge of the support plate 104 during its downward movement. With the support plate 104 in the ground position, the person 99 can maneuver him/herself, without using his/her legs, from a seated position on the support plate 104 with his/her back to the wheelchair 10 (e.g., as in FIG. 3B) into a seated position on the ground (e.g., as in FIG. 3A).

In addition to the preceding, the following example embodiments fall within the scope of the present disclosure or appended claims. Any given Example below that refers to multiple preceding Examples shall be understood to refer to only those preceding Examples with which the given Example is not inconsistent, and to exclude implicitly those preceding Examples with which the given Example is inconsistent.

Example 1. A wheelchair lift apparatus comprising: (a) a lift rail structurally arranged to be connected to a wheelchair in a generally vertical orientation at a first front vertical frame member of the wheelchair; (b) a generally flat support plate (i) engaged with the lift rail to be movable along at least a portion of the lift rail and (ii) structurally arranged so that, with the lift rail connected to the wheelchair and the support plate engaged with the lift rail, the support plate extends forward from the wheelchair in a generally horizontal orientation; and (c) an actuator structurally arranged and operatively coupled to move the support plate along the lift rail between a ground position and a seat position, the support plate being positioned (i) on or near the ground while in the ground position and (ii) generally flush with a seat of the wheelchair while in the seat position.

Example 2. The wheelchair lift apparatus of Example 1 wherein, with the support plate in the ground position, a person can maneuver him/herself, without using his/her legs, (i) from a seated position on the ground into a seated position on the support plate with his/her back to the wheelchair, or (ii) from a seated position on the support plate with his/her back to the wheelchair into a seated position on the ground.

Example 3. The wheelchair lift apparatus of any one of Examples 1 or 2 wherein, with the support plate in the seat position, a person can maneuver him/herself, without using his/her legs, (i) from a seated position on the support plate with his/her back to the wheelchair into a seated position on the seat of the wheelchair, or (ii) from a seated position on the seat of the wheelchair into a seated position on the support plate with his/her back to the wheelchair.

Example 4. The wheelchair lift apparatus of any one of Examples 1 through 3 wherein the lift rail is detachably assembled with the first front vertical frame member of the wheelchair.

Example 5. The wheelchair lift apparatus of any one of Examples 1 through 3 wherein the lift rail is permanently attached to the first front vertical frame member of the wheelchair.

Example 6. The wheelchair lift apparatus of any one of Examples 1 through 3 wherein the lift rail is integrally formed with the first front vertical frame member of the wheelchair.

Example 7. The wheelchair lift apparatus of any one of Examples 1 through 6, the lift rail being arranged as a U-shaped or slotted lift rail channel, and the support plate being attached to a lift block that slides within the lift rail channel so as to engage the support plate with the lift rail.

Example 8. The wheelchair lift apparatus of Example 7, the actuator including a lead screw (i) positioned within the lift rail channel, (ii) passing through the lift block, and (iii) threadedly engaged with the lift block, the actuator further including a motor operatively coupled to turn the lead screw to move the lift block along the lift rail within the lift rail channel.

Example 9. The wheelchair lift apparatus of any one of Examples 1 through 8 further comprising a guide rail structurally arranged to be connected to the wheelchair in a generally vertical orientation at a second front vertical frame member of the wheelchair, the second front vertical frame member being opposite the first front vertical frame member, the support plate being engaged with the guide rail (i) to be moveable along at least a portion of the guide rail and (ii) to prevent or limit, with the support plate engaged with the lift rail and the guide rail, rotation or tilt of the support plate relative to the lift rail.

Example 10. The wheelchair lift apparatus of Example 9 wherein the guide rail is detachably assembled with the second front vertical frame member of the wheelchair.

Example 11. The wheelchair lift apparatus of Example 9 wherein the guide rail is permanently attached to the second front vertical frame member of the wheelchair.

Example 12. The wheelchair lift apparatus of Example 9 wherein the guide rail is integrally formed with the second front vertical frame member of the wheelchair.

Example 13. The wheelchair lift apparatus of any one of Examples 1 through 12, the guide rail being arranged as a U-shaped or slotted channel, and the support plate being attached to a guide block that slides within the guide rail channel so as to engage the support plate with the guide rail.

Example 14. The wheelchair lift apparatus of any one of Examples 1 through 13 further comprising a support leg structurally arranged to be connected to the wheelchair at a lower front portion of the wheelchair and moveable between (i) a support position in contact with the ground so as to prevent or limit forward tilting of the wheelchair and (ii) a retracted position not in contact with the ground so as to enable unimpeded rolling movement of the wheelchair.

Example 15. The wheelchair lift apparatus of Example 14, the support leg being manually moveable by the person between the support position and the retracted position.

Example 16. The wheelchair lift apparatus of Example 14 further comprising a support leg actuator structurally arranged and operatively coupled to move the support leg between the support position and the retracted position.

Example 17. The wheelchair lift apparatus of any one of Examples 1 through 16 further comprising an upper limit switch positioned and arranged so as to deactivate the actuator to limit movement of the support plate away from the ground position beyond the seat position.

Example 18. The wheelchair lift apparatus of any one of Examples 1 through 17 further comprising a lower limit switch positioned and arranged so as to deactivate the actuator to limit movement of the support plate away from the seat position beyond the ground position.

Example 19. The wheelchair lift apparatus of any one of Examples 1 through 18 further comprising one or more control switches connected to the actuator and operatively coupled to control the actuator, the one or more switches being (i) attached to or integrated into the actuator, (ii) attached to or integrated into the support plate, or (iii) structurally arranged to be attached to an armrest of the wheelchair.

Example 20. The wheelchair lift apparatus of any one of Examples 1 through 19 further comprising a remote-control module operatively coupled to control the actuator.

Example 21. The wheelchair lift apparatus of any one of Examples 1 through 20, wherein (i) the support plate including a vertically enlarged forward edge arranged so as to reduce the likelihood of a person in a sitting position on the support plate with his/her back to the wheelchair would slide forward off the support plate, or (ii) the wheelchair lift apparatus further comprises a safety belt or safety strap arranged for securing the person while seated on the support plate.

Example 22. The wheelchair lift apparatus of any one of Examples 1 through 21, the actuator being at least partly positioned within a housing on the lift rail or attached to an arm of the wheelchair, the housing being structurally arranged to enable retention, mounting, or attachment of one or more of: a smartphone, tablet, or other portable computing device, one or more tools or writing implements, one or more flashlights, or a cupholder.

Example 23. The wheelchair lift apparatus of any one of Examples 1 through 22 further comprising the wheelchair, the lift rail being connected to the wheelchair in a generally vertical orientation at the first front vertical frame member of the wheelchair, and the support plate being engaged with the lift rail.

Example 24. A method for a person to use the wheelchair lift of any one of Examples 1 through 23, the method comprising: (A) with the support plate in the ground position, maneuvering him/herself, without using his/her legs, from a seated position on the ground into a seated position on the support plate with his/her back to the wheelchair; (B) after part (A), with the person in the seated position on the support plate, activating the actuator to move the support plate from the ground position to the seat position; (C) after part (B), maneuvering him/herself, without using his/her legs, from a seated position on the support plate with his/her back to the wheelchair into a seated position on the seat of the wheelchair; and (D) after part (C), activating the actuator to move the support plate from the seat position toward the ground position, stopping with the support plate at a position at or above the ground position to act as a footrest for the person in the seated position on the seat of the wheelchair.

Example 25. A method of Example 24 further comprising: (F) before part (A), setting a brake of the wheelchair, and moving a support leg into a support position in contact with the ground so as to prevent or limit forward tilting of the wheelchair; and (G) after part (C) or after part (D), releasing the brake and retracting the support leg so as to enable unimpeded rolling movement of the wheelchair.

Example 26. A method for a person to use the wheelchair lift of any one of Examples 1 through 23, the method comprising: (A) with the person in a seated position on the seat of the wheelchair, activating the actuator to move the support plate away from the ground position to the seat position; (B) after part (A), maneuvering him/herself, without using his/her legs, from a seated position on the seat of the wheelchair into a seated position on the support plate with his/her back to the wheelchair; (C) after part (B), with the person in the seated position on the support plate, activating the actuator to move the support plate from the seat position to the ground position; and (D) with the support plate in the ground position, maneuvering him/herself, without using his/her legs, from a seated position on the support plate with his/her back to the wheelchair into a seated position on the ground.

Example 27. A method of Example 26 further comprising, before part (A), setting a brake of the wheelchair, and moving a support leg into a support position in contact with the ground so as to prevent or limit forward tilting of the wheelchair.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth, or if a differing interpretation is implicit or inherent (e.g., some small integer quantities). For null quantities described by phrases such as "equal to zero," "absent," "eliminated," "negligible," "prevented," and so forth (with or without terms such as "about," "substantially," and so forth), each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled. Terms such as "parallel," "perpendicular," "orthogonal," "flush," "aligned," vertical," horizontal," and so forth shall be similarly interpreted (with or without terms such as "about," "substantially," "generally," and so forth).

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

The invention claimed is:

1. A wheelchair lift apparatus comprising:

(a) a lift rail structurally arranged to be connected to a wheelchair in a generally vertical orientation at a first front vertical frame member of the wheelchair;

(b) a generally flat support plate (i) engaged with the lift rail to be movable along at least a portion of the lift rail and (ii) structurally arranged so that, with the lift rail connected to the wheelchair and the support plate engaged with the lift rail, the support plate extends forward from the wheelchair in a generally horizontal orientation;

(c) an actuator structurally arranged and operatively coupled to move the support plate along the lift rail between a ground position and a seat position, the support plate being positioned (i) on or near the ground while in the ground position and (ii) generally flush with a seat of the wheelchair while in the seat position; and (d) a support leg structurally arranged to be connected to the wheelchair at a lower front portion of the wheelchair and moveable between (i) a support position in contact with the ground so as to prevent or limit forward tilting of the wheelchair and (ii) a retracted position not in contact with the ground so as to enable unimpeded rolling movement of the wheelchair.

2. The wheelchair lift apparatus of claim 1 wherein, with the support plate in the ground position, a person can maneuver him/herself, without using his/her legs, (i) from a seated position on the ground into a seated position on the support plate with his/her back to the wheelchair, or (ii) from the seated position on the support plate with his/her back to the wheelchair into the seated position on the ground.

3. The wheelchair lift apparatus of claim 1 wherein, with the support plate in the seat position, a person can maneuver him/herself, without using his/her legs, (i) from a seated position on the support plate with his/her back to the wheelchair into a seated position on the seat of the wheelchair, or (ii) from the seated position on the seat of the wheelchair into the seated position on the support plate with his/her back to the wheelchair.

4. The wheelchair lift apparatus of claim 1 wherein the lift rail is detachably assembled with the first front vertical frame member of the wheelchair.

5. The wheelchair lift apparatus of claim 1 wherein the lift rail is permanently attached to the first front vertical frame member of the wheelchair.

6. The wheelchair lift apparatus of claim 1 wherein the lift rail is integrally formed with the first front vertical frame member of the wheelchair.

7. The wheelchair lift apparatus of claim 1, the lift rail being arranged as a U-shaped or slotted lift rail channel, and the support plate being attached to a lift block that slides within the lift rail channel so as to engage the support plate with the lift rail.

8. The wheelchair lift apparatus of claim 7, the actuator including a lead screw (i) positioned within the lift rail channel, (ii) passing through the lift block, and (iii) threadedly engaged with the lift block, the actuator further including a motor operatively coupled to turn the lead screw to move the lift block along the lift rail within the lift rail channel.

9. The wheelchair lift apparatus of claim 1 further comprising a guide rail structurally arranged to be connected to the wheelchair in a generally vertical orientation at a second front vertical frame member of the wheelchair, the second front vertical frame member being opposite the first front vertical frame member, the support plate being engaged with the guide rail (i) to be moveable along at least a portion of the guide rail and (ii) to prevent or limit, with the support plate engaged with the lift rail and the guide rail, rotation or tilt of the support plate relative to the lift rail.

10. The wheelchair lift apparatus of claim 9 wherein the guide rail is detachably assembled with the second front vertical frame member of the wheelchair.

11. The wheelchair lift apparatus of claim 9 wherein the guide rail is permanently attached to the second front vertical frame member of the wheelchair.

12. The wheelchair lift apparatus of claim 9 wherein the guide rail is integrally formed with the second front vertical frame member of the wheelchair.

13. The wheelchair lift apparatus of claim 9, the guide rail being arranged as a U-shaped or slotted channel, and the support plate being attached to a guide block that slides within the guide rail channel so as to engage the support plate with the guide rail.

14. The wheelchair lift apparatus of claim 1, the support leg being manually moveable by the person between the support position and the retracted position.

15. The wheelchair lift apparatus of claim 1, further comprising a support leg actuator structurally arranged and operatively coupled to move the support leg between the support position and the retracted position.

16. The wheelchair lift apparatus of claim 1 further comprising an upper limit switch positioned and arranged so as to deactivate the actuator to limit movement of the support plate away from the ground position beyond the seat position.

17. The wheelchair lift apparatus of claim 1 further comprising a lower limit switch positioned and arranged so as to deactivate the actuator to limit movement of the support plate away from the seat position beyond the ground position.

18. The wheelchair lift apparatus of claim 1 further comprising one or more control switches connected to the actuator and operatively coupled to control the actuator, the one or more switches being (i) attached to or integrated into the actuator, (ii) attached to or integrated into the support plate, or (iii) structurally arranged to be attached to an armrest of the wheelchair.

19. The wheelchair lift apparatus of claim 1 further comprising a remote-control module operatively coupled to control the actuator.

20. The wheelchair lift apparatus of claim 1, the support plate including a vertically enlarged forward edge arranged so as to reduce the likelihood of a person in a sitting position on the support plate with his/her back to the wheelchair would slide forward off the support plate.

21. The wheelchair lift apparatus of claim 1, the actuator being at least partly positioned within a housing on the lift rail or attached to an arm of the wheelchair, the housing being structurally arranged to enable retention, mounting, or attachment of one or more of: a smartphone, tablet, or other portable computing device, one or more tools or writing implements, one or more flashlights, or a cupholder.

22. The wheelchair lift apparatus of claim 1 further comprising the wheelchair, the lift rail being connected to the wheelchair in a generally vertical orientation at the first front vertical frame member of the wheelchair, and the support plate being engaged with the lift rail.

23. A method for a person to use the wheelchair lift of claim 1, the method comprising:

(A) with the support plate in the ground position, maneuvering him/herself, without using his/her legs, from a seated position on the ground into a seated position on the support plate with his/her back to the wheelchair;

(B) after part (A), with the person in the seated position on the support plate, activating the actuator to move the support plate from the ground position to the seat position;

(C) after part (B), maneuvering him/herself, without using his/her legs, from the seated position on the support plate with his/her back to the wheelchair into a seated position on the seat of the wheelchair; and (D) after part (C), activating the actuator to move the support plate from the seat position toward the ground position, stopping with the support plate at a position at or above the ground position to act as a footrest for the person in the seated position on the seat of the wheelchair.

24. A method of claim 23 further comprising:

(F) before part (A), setting a brake of the wheelchair, and moving the support leg into the support position in contact with the ground so as to prevent or limit forward tilting of the wheelchair; and (G) after part (C) or after part (D), releasing the brake and retracting the support leg so as to enable unimpeded rolling movement of the wheelchair.

25. A method for a person to use the wheelchair lift of claim 1, the method comprising:

(A) with the person in a seated position on the seat of the wheelchair, activating the actuator to move the support plate away from the ground position to the seat position;

(B) after part (A), maneuvering him/herself, without using his/her legs, from the seated position on the seat of the wheelchair into a seated position on the support plate with his/her back to the wheelchair;

(C) after part (B), with the person in the seated position on the support plate, activating the actuator to move the support plate from the seat position to the ground position; and (D) with the support plate in the ground position, maneuvering him/herself, without using his/her legs, from the seated position on the support plate with his/her back to the wheelchair into a seated position on the ground.

26. A method of claim 25 further comprising, before part (A), setting a brake of the wheelchair, and moving the support leg into the support position in contact with the ground so as to prevent or limit forward tilting of the wheelchair.

27. The wheelchair lift apparatus of claim 1 further comprising a foot portion attached to a lower end of the support leg, the foot portion extending medially from the support leg so as to prevent or limit lateral tilting of the wheelchair.

28. The wheelchair lift apparatus of claim 1, the support leg being slidably engaged with a lower portion of the lift rail.

* * * * *